United States Patent
Xu et al.

(10) Patent No.: US 9,526,041 B2
(45) Date of Patent: Dec. 20, 2016

(54) APPARATUS AND METHOD FOR SUPPORTING HANDOVER TO CSG CELL OR HYBRID CELL

(71) Applicant: Samsung Electronics Co., Ltd., Gyeonggi-do (KR)

(72) Inventors: Lixiang Xu, Beijing (CN); Hong Wang, Beijing (CN); Huarui Liang, Beijing (CN); Xiaowan Ke, Beijing (CN)

(73) Assignee: SAMSUNG ELECTRONICS CO., LTD, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/385,492

(22) PCT Filed: Mar. 15, 2013

(86) PCT No.: PCT/KR2013/002113
§ 371 (c)(1),
(2) Date: Sep. 15, 2014

(87) PCT Pub. No.: WO2013/137684
PCT Pub. Date: Sep. 19, 2013

(65) Prior Publication Data
US 2015/0072686 A1    Mar. 12, 2015

(30) Foreign Application Priority Data

Mar. 15, 2012  (CN) .......................... 2012 1 0069437

(51) Int. Cl.
*H04W 36/00*    (2009.01)
*H04W 36/04*    (2009.01)
*H04W 84/04*    (2009.01)

(52) U.S. Cl.
CPC ......... *H04W 36/0061* (2013.01); *H04W 36/04* (2013.01); *H04W 84/045* (2013.01)

(58) Field of Classification Search
CPC . H04W 36/0061; H04W 84/045; H04W 36/04
USPC ........................................................ 455/436
See application file for complete search history.

(56) References Cited

U.S. PATENT DOCUMENTS

| | | | |
|---|---|---|---|
| 2011/0182235 A1* | 7/2011 | Shaheen et al. .............. | 370/328 |
| 2012/0157095 A1* | 6/2012 | Fodor ..................... | H04W 4/08 455/434 |
| 2013/0109380 A1* | 5/2013 | Centonza et al. ............ | 455/434 |

(Continued)

OTHER PUBLICATIONS

International Search Report dated Jul. 1, 2013 in connection with International Patent Application No. PCT/KR2013/002113, 3 pages.

(Continued)

*Primary Examiner* — Tanmay Shah

(57) ABSTRACT

The present invention discloses a method for supporting a handover to a closed subscriber group (CSG) cell or a hybrid cell in a mobile communication system, and the method includes: sending, by a radio access network (RAN), information indicating that authorized public land mobile network (PLMN) information changes to a user equipment (UE); sending, by the UE, all PLMN identifiers (IDs) broadcasted by a target CSG cell to a source RAN in a measurement report; and selecting, by the source RAN or a source core network(CN), a target PLMN for the UE.

36 Claims, 6 Drawing Sheets

(56) References Cited

U.S. PATENT DOCUMENTS

2014/0228031 A1* 8/2014 Masini .............. H04W 36/0083
455/436

OTHER PUBLICATIONS

Written Opinion of International Searching Authority dated Jul. 1, 2013 in connection with International Patent Application No. PCT/KR2013/002113, 5 pages.

3GPP TS 25.367 V9.1.0 (Sep. 2009), 3rd General Partnership Project; Technical Specification Group Radio Access Network; Mobility Procedures for Home NodeB; Overall Description; Stage 2 (Release 9), 13 pages.

ETSI TS 123 251 V.10.1,0 (Mar. 2011), "Universal Mobile Telecommunications System (UMTS); LTE; Network Sharing; Architecture and Functional Description (3GPP TS 23.251 version 10.1.0 Release 10)", 27 pages.

Gavin Horn, "3GPP Femtocells: Architecture and Protocols", Qualcomm Incorporated, 2010, Sep. 15, 2010, 64 pages.

* cited by examiner

APPARATUS AND METHOD FOR SUPPORTING HANDOVER TO CSG CELL OR HYBRID CELL

PRIORITY

The present application claims priority under 35 U.S.C. §365 to International Patent Application No. PCT/KR2013/002113 filed Mar. 15, 2013, entitled "APPARATUS AND METHOD FOR SUPPORTING HANDOVER TO CSG CELL OR HYBRID CELL". International Patent Application No. PCT/KR2013/002113 claims priority under 35 U.S.C. §365 and/or 35 U.S.C. §119(a) to Chinese Patent Application No. 201210069437.1 filed Mar. 15, 2012 and which are incorporated herein by reference into the present disclosure as if fully set forth herein.

TECHNICAL FIELD

The present invention relates to an apparatus and method for supporting handover in a mobile communication system, more particularly to an apparatus and method for supporting a handover to a closed subscriber group (CSG) cell or a hybrid cell.

BACKGROUND ART

In a mobile communication system, a CSG including multiple wireless resource management entities is always formed for a given user equipment (UE) group, so as to provide better services for the given UE group. For example, all UEs within a company or a school are a given UE group, and a CSG including multiple wireless resource management entities is formed for the UE group to provide special access services.

It is ubiquitous in a mobile communication system that multiple wireless resource management entities form the CSG for the given UE group. A long term evolution (LTE) system of system architecture evolution (SAE) is taken as an example to describe these clearly.

FIG. 1 is a schematic diagram illustrating a LTE system. As shown in FIG. 1, in the wireless access network of the LTE system, the wireless resource management entities includes evolved node B (eNB) 101, home eNB (HeNB) 102, and an optional HeNB GW 103. The eNBs 101 connect with each other via an X2 interface, each eNB 101 directly connects with a mobile management entity (MME) 104 in a core network via an 51 interface respectively; HeNB 102 may connect with HeNB GW 103 via the S1 interface, and HeNB GW 103 connects with MME 104 via the S1 interface; or HeNB 102 may directly connect with MME 104 via the S1 interface; or when there is no HeNB GW 103 in the system, HeNB 102 directly connects with MME 104 via the S1 interface. In addition, eNB 101 and HeNB 102 may both connect with multiple MMEs 104 in the core network.

In order to provide better access services, various wireless resource management entities are provided. Taking HeNB 102 in the LTE system of FIG. 1 as an example, there are HeNBs of an open type, HeNBs of a hybrid type and HeNBs of a CSG type. The UEs accessing the HeNB of the open type are not limited and any UE can access the HeNB of the open type; only UEs in a certain UE group (the UE in the certain UE group is called as CSG UE for convenience) served by the HeNB of the CSG type can access the HeNB of the CSG type; CSG UEs served by the HeNB of the hybrid type can access the HeNB of the hybrid type, so that better access services can be provided for the CSG UEs, meanwhile other non-CSG UEs also can access the HeNB of the hybrid type.

FIG. 2 is a flowchart illustrating a procedure that UE moves to a HeNB CSG or a HeNB hybrid cell by taking a S1 handover as an example. A source eNB may be a macro eNB or a HeNB. As shown in FIG. 2, the procedure includes the following operations.

In block 201: a source eNB (S-(H)eNB) configures UE to send a Proximity Indication control, In block 202: when the UE reaches a CSG cell or a hybrid cell (a CSG ID of the cell is in a list of accessible CSGs of the UE), the UE sends a Proximity Indication of "entering" to an eNB. The Proximity Indication includes a radio access technology (RAT) and frequency information of the proximity cell.

In block 203: if measurement configurations of the frequency/RAT do not exist, the source eNB configures corresponding measurement for the UE, and the measurement may include a measurement interval. In this way, the UE can perform measurement of the reported RAT and frequency.

In block 204: the UE sends a measurement report to the eNB. The measurement report includes protocol control information (PCI) of the measured cell.

In block 205: the source eNB configures the UE to obtain and report System Information (SI) of a cell corresponding to given PCI.

In block 206: the UE obtains SI related to a target HeNB by using an automatic interval. In block 207: the UE sends a measurement report to the eNB. The message includes an E-UTRAN cell global identifier (ECGI), tracking area code (TAC), CSG ID and members of the target HeNB cell.

In block 208: the source eNB sends a handover requirement message to an MME. The message includes the ECGI and CSG ID of a target cell. If the target cell is in a hybrid access mode, the message includes a cell access mode.

In block 209: the MME performs access control for the UE according to the received CSG ID and the stored signed CSG information of the UE. After the access control is failed, the MME sends a handover preparing failure message to the source eNB to terminate this handover procedure. If the handover requirement message includes the cell access mode, the MME decides a member state of the UE and sends the member state to the target eNB via a handover request message.

In block 210: the MME sends the handover request message to a Target-HeNB. If HeNB GWs are deployed, the handover request message is sent to the target HeNB via the HeNB The message includes CSG ID. If the target cell is in a hybrid access mode, the message also includes a CSG member indication.

In block 211: the target HeNB determines whether the CSG ID in the received handover request message is the CSG ID broadcasted by the target cell. If yes, appropriate resources are assigned. If the CSG member indication indicating that the UE is the member, the target HeNB performs priority principle for the UE.

In block 212: the target HeNB sends a handover request acknowledgement message to the MME. If the HeNB GWs are deployed, the handover request acknowledgement message is sent to the MME via the HeNB GW.

In block 213: the MME sends a handover command message to the source eNB.

In block 214: the source eNB sends the handover command message to the UE, A RRC connection re-configuration message includes mobile control information.

In the procedure of moving to the CSG cell by the UE, the access control is implemented via two steps, the UE determines whether the UE is the member of the target cell according to the CSG ID of the target cell and the list of the accessible CSGs of the UE stored by the UE, and the UE reports that the UE is the member to the network. The MME further authenticates the UE in the block 209.

Thus, the conventional procedure for implementing that the UE moves to the HeNB via the S1 handover is finished.

When the target cell (not the CSG cell or the hybrid cell) supports radio access network (RAN) share, the source eNB selects one public land mobile network (PLMN) as a new PLMN registered by the UE according to an intersection of PLMNs supported by the target cell and accessible PLMNs of the UE.

If the target cell is the CSG cell supporting the RAN share, the target cell broadcasts multiple supported PLMN identifiers and CSG IDs. If (PLMN1, broadcasted CSG ID) is in the list of the accessible CSGs of the UE, the UE is the member. The PLMN1 is the PLMN broadcasted by the target cell and the PLMN1 also is a current registered PLMN (rPLMN) or equivalent PLMN (ePLMN) of the UE. When the UE is the member of the CSG cell, the UE reports the CGI, TAI, CSG ID and a member identity to the source eNB.

After receiving the report of the UE, the source eNB does not know the PLMNs supported by the target HeNB cell, and does not know the PLMNs of which the UE is the member either, and thus the source eNB can not select the target PLMN. If the target PLMN is not selected appropriately, the handover will fail and continuity of the UE services will be affected.

For example:

UE rPLMN=B, ePLMN={A,C}, a list of accessible CSGs={(c1, A), (c1, B), (c2, A)}

The standby HO target cell broadcasts PLMNs {D, A, C, E}, CSG=c1

Because (c1, A) is in the list of the accessible CSGs of the UE, the UE will indicate the member identity to the source eNB. The source eNB does not know the PLMNs supported by the target cell, the source eNB can only know the first PLMN broadcasted by the target cell from the ECGI, e.g. D, but D is not the accessible rPLMN or ePLMN of the UE, and thus the source eNB can not perform the handover procedure. This problem also exists when the target cell is the hybrid cell and supports multiple PLMNs. The source eNB originally selects a hybrid cell under a PLMN of which the UE is the member, but because of the above problem, it is possible that the source eNB selects a hybrid cell under a PLMN of which the UE is not the member, and thus the UE can not enjoy better service quality and accounting strategy.

Even if the source eNB knows the PLMNs broadcast by the target eNB cell, the source eNB needs to select a new registered PLMN of the UE from PLMN{C} according to the PLMNs {D, A, C, E} broadcasted by the target cell and the accessible PLMN{B, A, C} of the UE. But the source eNB does not know the PLMNs of which the UE is the member, if the source eNB selects the PLMN C, the handover will fail. If the target cell is the hybrid cell or supports multiple PLMNs, the source eNB may select any PLMN, but the following problem is produced. The UE originally can access a PLMN of which the UE is the member, e.g. (c1, A), but the source eNB makes the UE access the PLMN of which the UE is not the member, e.g. (c1, C). Therefore, the UE can not enjoy good service quality and accounting strategy.

In order to solve the above problem, in one mode, the UE firstly filters out such PLMN: the PLMN is in the PLMNs broadcasted by the target cell, is the rPLMN or ePLMN of the UE, the PLMN ID and the CSG ID are in a list of accessible CSGs of the UE. The UE sends the filtered out PLMNs to the source eNB via a measurement report; the source eNB selects the PLMN which is the rPLMN or ePLMN of the UE from the PLMNs reported by the UE. The source eNB sends the selected PLMN and a CSG identification of the target cell to a source SGSN/MME, and the SGSN or MME performs a final member authentication.

But when the UE is in a CS field, there is no location area update procedure for the UE in a connection mode, The UE can not obtain the updated rPLMN or ePLMN in time. Therefore, after the UE performs the filtering according to the above principle, a current accessible PLMN of the UE may be not obtained, and thus the problem can not be solved correctly.

In addition, when the target CSG cell does not support the RAN share, because the UE in the CS field can not obtain the updated rPLMN or ePLMN in time, when the UE performs primary access control, the UE which is the member may be incorrectly determined as a non-member. If the UE reports a non-member identity to the source RAN, the source RAN will not initiate the handover procedure to the target cell, and thus the UE can not access the HeNB of the UE.

DISCLOSURE

Technical Problem

The present invention provides an apparatus and method for supporting a handover to a CSG cell or a hybrid cell in a mobile communication system, especially an apparatus and method for supporting a handover to a CSG cell or a hybrid cell of UE in a CS field, so as to avoid failures in a handover procedure and ensure continuity of services. A method for selecting a PLMN for handover to a CSG cell or a hybrid cell is provided for both the LTE and a universal mobile telecommunications system (UMTS). Especially, when the UE is in a CS field, correct access control judgment is performed for the UE to ensure the access of the UE. When a target cell is the CSG cell or the hybrid cell supporting network sharing, an appropriate PLMN is selected for the UE.

Technical Solution

In order to achieve the above object, the technical solutions of the embodiments of the present invention include:

a method for supporting handover to a CSG cell or a hybrid cell, comprising:

a RAN notifying UE of that authorized PLMN information changes;

the UE sending all PLMN IDs broadcasted by a target CSG cell to a source RAN in a measurement report;

the source RAN or a source CN selecting a target PLMN for the UE.

It should be noted that, the RAN notifies the UE of that the authorized PLMN information changes when authorized PLMN information received by the RAN from a core network changes.

It should be noted that, when UE PLMN information changes, the UE sends all PLMN IDs broadcasted by the target CSG cell to the source RAN.

It should be noted that, the source RAN selects the target PLMN for the UE via two methods.

In the first method, the source RAN filters out the PLMN ID of the authorized PLMN of the UE from a PLMN list received from the UE; the source RAN sends a list of the filtered out PLMN IDs and the CSG ID of the target cell to the core network; the core network, according to information of the accessible CSGs of the UE, filters out such PLMN ID in the PLMN IDs received from the source RAN, the PLMN ID and the CSG ID are in the list of the accessible CSGs of the UE; the CN sends the filtered out PLMN ID to the source RAN; the RAN selects the target PLMN ID for the UE from the received PLMN ID list.

In the second method, the core network sends information of the accessible CSGs of the UE to the RAN; the RAN, according to the CSG list received from the UE, filters out the authorized PLMN ID of the UE, and the PLMN ID and the CSG ID are in the list of the accessible CSGs of the UE; the RAN selects the target PLMN ID for the UE from the filtered out PLMN IDs.

It should be noted that, when the source CN selects the target PLMN for the UE:

the source RAN filters out a list of the authorized PLMN IDs of the UE from the PLMN IDs received from the UE; the source RAN sends the filtered out PLMN ID list and the CSG ID of the target cell to the source CN of the core network; the source CN, according to the information of the accessible CSGs of the UE, selects PLMN IDs from the PLIMN IDs received from the source RAN, the selected PLMN ID and the CSG ID are in the list of the accessible CSGs of the UE; the source CN selects the target PLMN ID for the UE from the selected PLMN IDs.

It should be noted that, when the UE moves from the source RAN, e.g. RAN1 to another RAN2, RAN1 or the CN may notify the RAN2 that the authorized PLMN information of the UE in a connection mode had changed. Hence, when the UE moves from RAN2 (the source of the next handover) to the CSG cell or the hybrid cell, RAN2 knows that the UE reports all PLMNs broadcasted by the target cell, and thus RAN2 can select the PLMN for the UE according to the above procedure or request the source CN to select the PLMN for the UE.

A method for supporting handover to a closed subscriber group (CSG) cell or a hybrid cell includes:

a RAN notifying UE of that authorized PLMN information changes;

the UE sending a list of PLMN IDs selected from the PLMN IDs broadcasted by the target CSG cell to a source RAN in a measurement report; the PLMN ID in the list being an rPLMN or an ePLMN of the UE, and the PLMN ID and the CSG ID are in the list of the accessible CSGs of the UE;

the source RAN selecting a target PLMN for the UE.

MODE FOR INVENTION

In order to solve problems in the prior art, the present invention provides a method for supporting handover, which includes a RAN notifying user equipment (UE) of that authorized PLMN information changes; the UE sending all PLMN IDs broadcasted by a target CSG cell to a source RAN in a measurement report; the source RAN or a source CN selecting a target PLMN for the UE. The present invention also provides other methods for supporting handover to a CSG cell or a hybrid cell. By using the methods of the present invention, failures in a handover procedure is avoided, and continuity of services is ensured. A method for selecting a PLMN for handover to a CSG cell or a hybrid cell is provided for both the LTE and a UMTS. Especially, when the UE is in a CS field, correct access control judgment is performed for the UE to ensure the access of the UE. When a target cell is the CSG cell or the hybrid cell supporting network sharing, an appropriate PLMN is selected for the UE.

In order to make the object, technical solution and merits of the present invention clearer, the present invention will be illustrated in detail hereinafter with reference to the accompanying drawings and specific examples.

Figure 1:
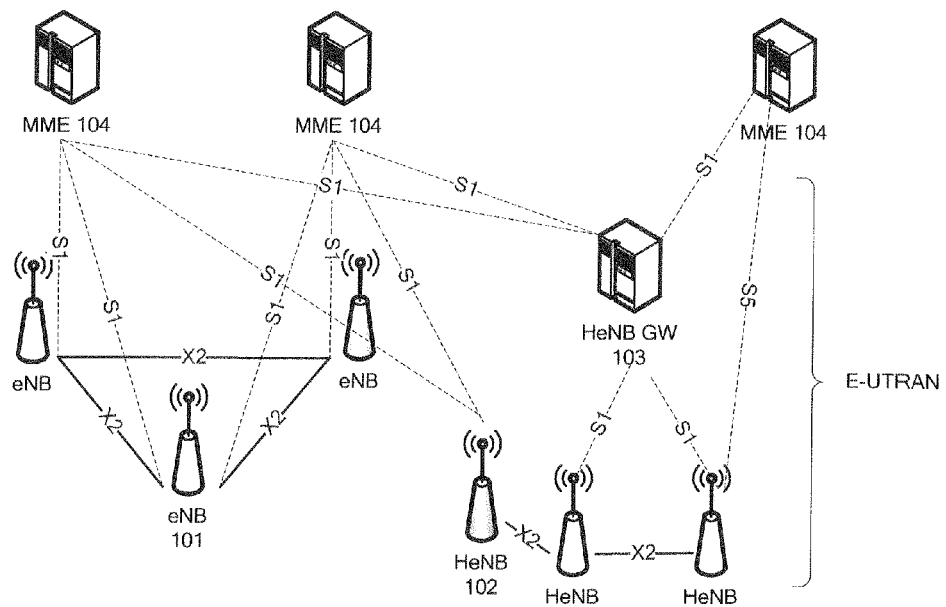
FIG. 1 is a schematic diagram illustrating a LTE system.
Figure 2:
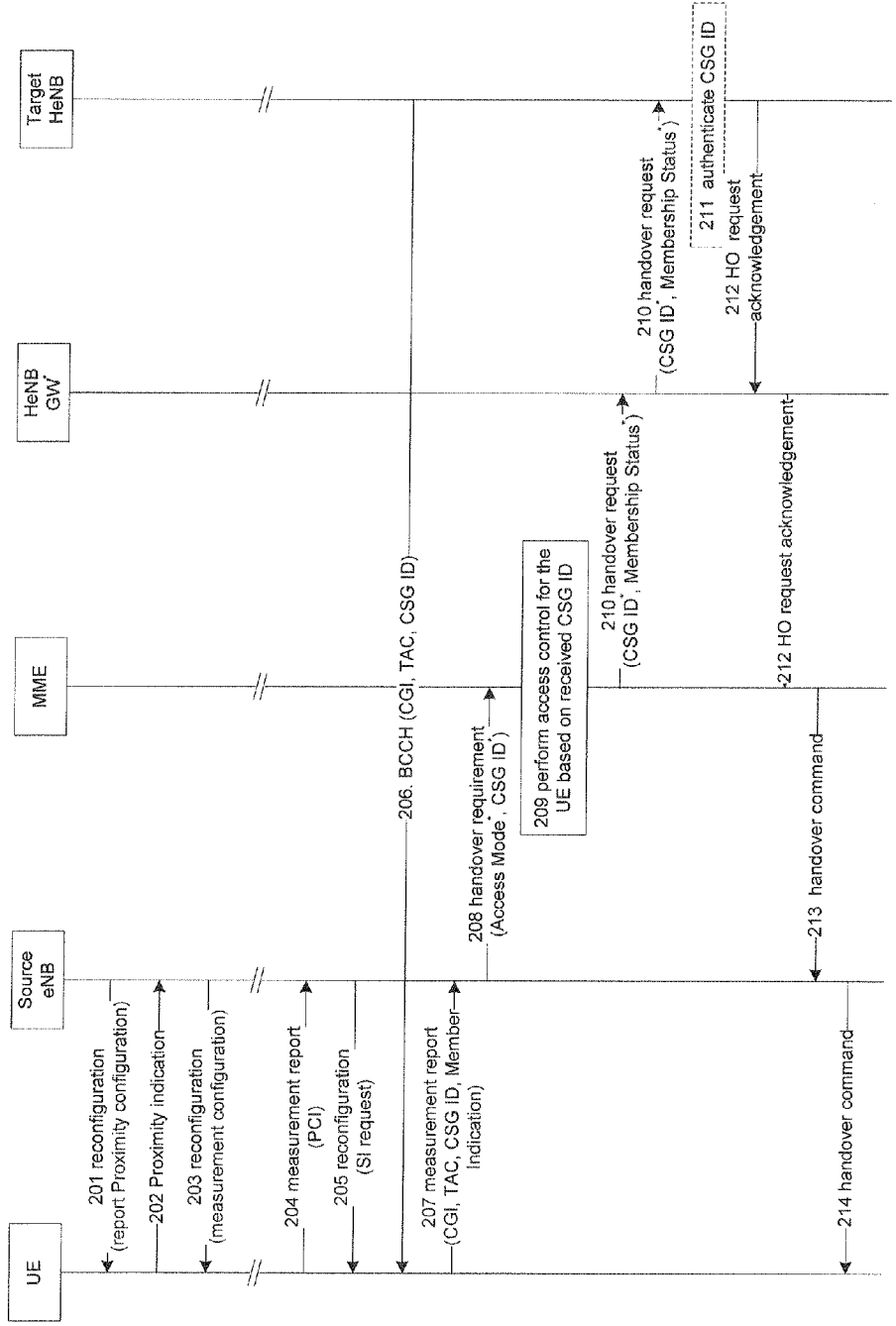
FIG. 2 is a flowchart illustrating a conventional S1 handover for moving to a CSG cell.
Figure 3:
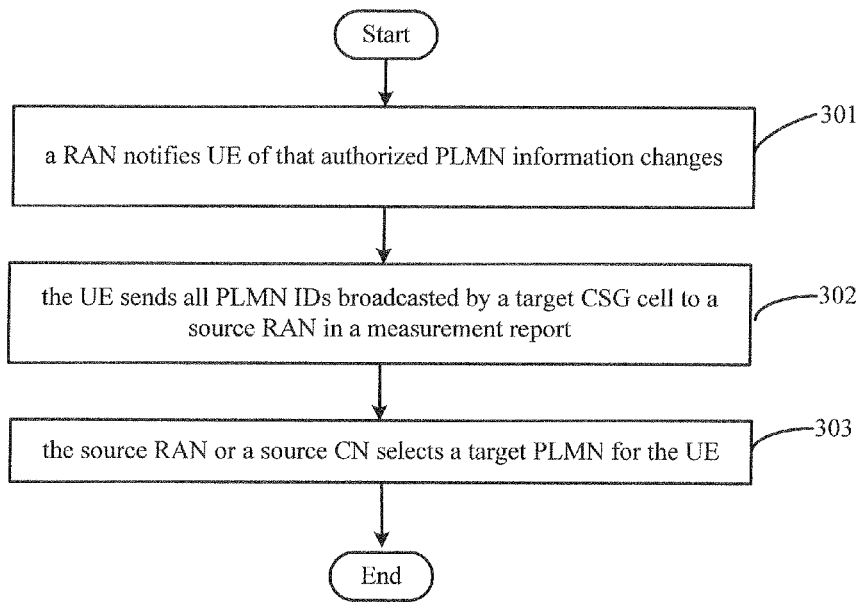
FIG. 3 is a flowchart illustrating a first method for supporting handover to a CSG cell or a hybrid cell according to an embodiment of the present invention.

FIG. 3 is a flowchart illustrating a first method for supporting handover to a CSG cell or a hybrid cell according to an embodiment of the present invention. The operations not related to the present invention are omitted. As shown in FIG. 3, the method includes the following operations.

In block 301: a radio access network (RAN) notifies UE of that authorized PLMN information changes.

The RAN notifies the UE of that the authorized PLMN information changes when authorized PLMN information received from a core network by the RAN changes. Indication information may be used to indicating that the authorized PLMN information changes The UE saves the indication information indicating that the authorized PLMN information changes.

In block 302: in a measurement report, the UE sends all PLMN IDs broadcasted by a target CSG cell to a source RAN.

When the authorized PLMN information of the UE changes, the UE sends all PLMN IDs broadcasted by the target CSG cell to the source RAN. When the authorized PLMN information of the UE is unchanged, the UE filters out such PLMN ID from the PLMN IDs broadcasted by the target cell, the PLMN corresponds to an rPLMN or ePLMN of the UE, the PLMN ID and a CSG ID of the target cell are in a list of accessible CSGs of the UE. The UE sends the filtered out PLMN ID to the source RAN.

In block 303: the source RAN or a source CN selects a target PLMN for the UE.

The source RAN selects the target PLMN for the UE via two methods.

In the first method, the source RAN filters out the PLMN ID of the authorized PLMN of the UE from a PLMN list received from the UE; the source RAN sends a list of the filtered out PLMN IDs and the CSG ID of the target cell to the core network; the core network, according to information of the accessible CSGs of the UE, filters out such PLMN ID in the PLMN IDs received from the source RAN, the PLMN ID and the CSG ID are in the list of the accessible CSGs of the UE; the CN sends the filtered out PLMN ID to the source RAN; the RAN selects the target PLMN ID for the UE from the received PLMN ID list.

In the second method, the core network sends information of the accessible CSGs of the UE to the RAN; the RAN, according to the CSG list received from the UE, filters out the authorized PLMN ID of the UE, and the PLMN ID and the CSG ID are in the list of the accessible CSGs of the UE; the RAN selects the target PLMN ID for the UE from the filtered out PLMN IDs.

When the source CN selects the target PLMN for the UE:
the source RAN filters out a list of the authorized PLMN IDs of the UE from the PLMN IDs received from the UE; the source RAN sends the filtered out PLMN ID list and the CSG ID of the target cell to the source CN of the core network; the source CN, according to the information of the accessible CSGs of the UE, selects one PLMN ID from the PLIMN IDs received from the source RAN, the PLMN ID and the CSG ID are in the list of the accessible CSGs of the UE; the source CN selects the target PLMN ID for the UE.

It should be noted that, when the UE moves from the source RAN, e.g. RAN1 to another RAN2, RAN1 or the CN may notify the RAN2 that the authorized PLMN information of the UE in a connection mode had changed. Hence, when the UE moves from RAN2 (the source of the next handover) to the CSG cell or the hybrid cell, RAN2 knows that the UE reports all PLMNs broadcasted by the target cell, and thus RAN2 can select the PLMN for the UE according to the above procedure or request the source CN to select the PLMN for the UE.

Thus, the whole work procedure of the first method supported by the present invention is terminated.

Figure 4:
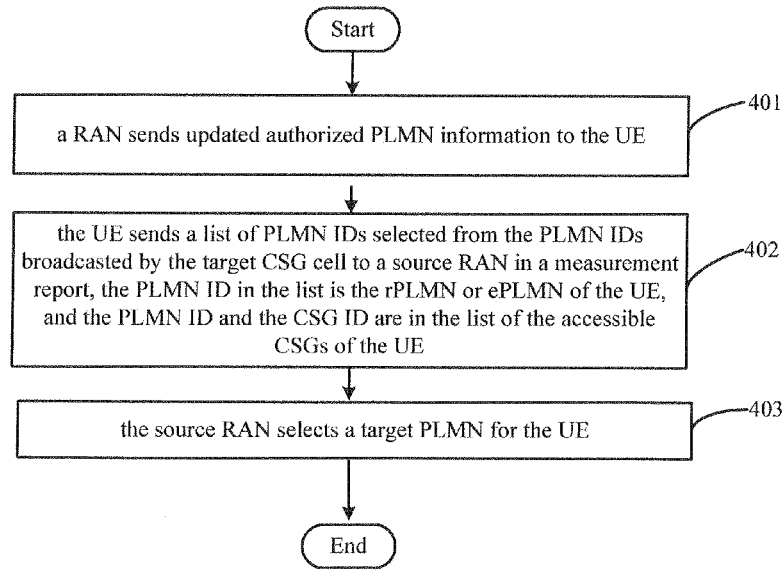
FIG. 4 is a flowchart illustrating a second method for supporting handover to a CSG cell or a hybrid cell according to an embodiment of the present invention.

FIG. 4 is a flowchart illustrating a second method for supporting handover to a CSG cell or a hybrid cell according to an embodiment of the present invention. The operations not related to the present invention are omitted. As shown in FIG. 4, the method includes the following operations.

In block 401: a RAN sends updated authorized PLMN information to the UE. The information includes a list of PLMNs that the UE is authorized to access. The information also indicates which one is an rPLMN and which ones are ePLMNs.

In block 402: in a measurement report, the UE sends a list of PLMN IDs selected from the PLMN IDs broadcasted by the target CSG cell to a source RAN, the PLMN ID in the list is the rPLMN or ePLMN of the UE, and the PLMN ID and the CSG ID are in the list of the accessible CSGs of the UE.

In block 403: the source RAN selects a target PLMN for the UE. The source RAN selects one PLMN which is the rPLMN or ePLMN of the UE from the PLMN IDs reported by the UE as the target PLMN.

Figure 5:
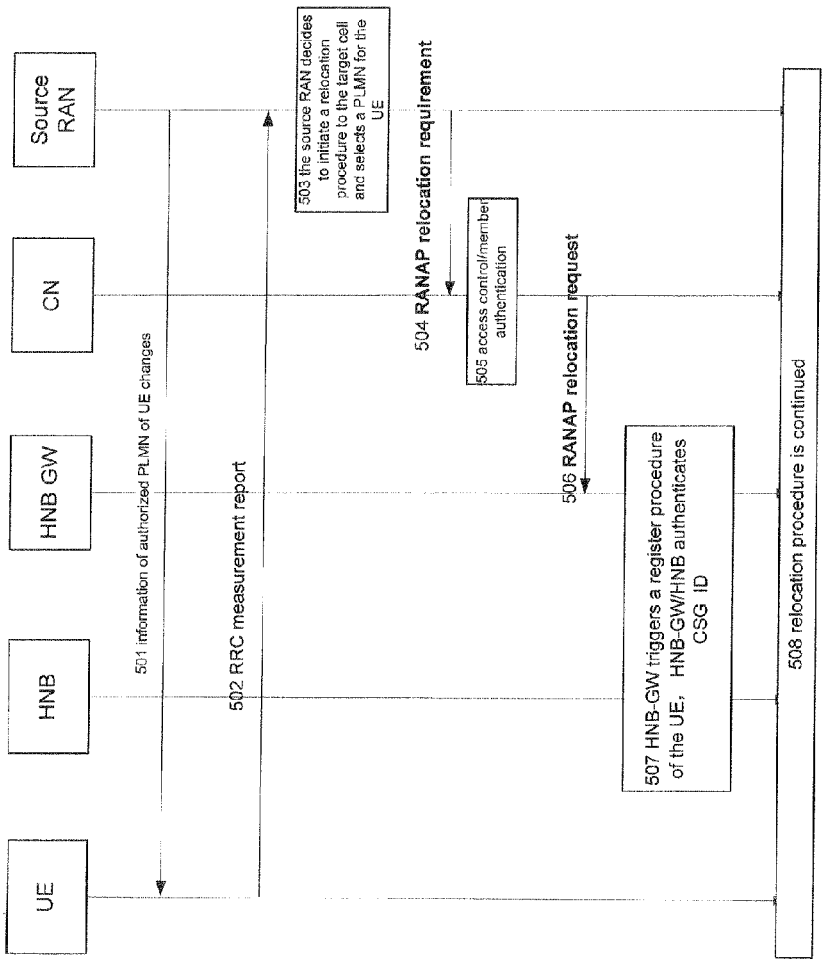
FIG. 5 is a flowchart illustrating a first method for supporting handover to a CSG cell or a hybrid cell according to a first embodiment of the present invention.

FIG. 5 is a flowchart illustrating a first method for supporting handover to a CSG cell or a hybrid cell according to a first embodiment of the present invention. The operations not related to the present invention are omitted. As shown in FIG. 5, the method includes the following operations.

In block 501: a RAN sends PLMN changing information to UE. The PLMN changing information may be an authorized PLMN changing indication. The source RAN may send the information to the UE when finding that the authorized PLMN information changes, for example, when new authorized PLMN information is received from a core network. The UE saves information indicating the authorized PLMN changes.

In block 502: the UE sends a RRC message measurement report to the source RAN. The measurement report includes a cell identification of a target CSG cell, a CSG identification. The message also includes PLMN IDs broadcasted by the target cell. The UE sends all PLMN IDs broadcasted by the target cell to the source RAN after receiving the authorized PLMN changing indication sent by the source RAN.

In block 503: the source RAN decides to initiate a relocation procedure to the target cell and selects a target PLMN for the UE. The method for selecting the target PLMN for the UE by source RAN is described in the block 303 and will not described herein.

In block 504: the source RAN sends a relocation requirement message to the CN. As an example of the present invention, an MME may select the target PLMN for the UE. Correspondingly, the source RAN filters out a list of authorized PLMN IDs of the UE from the PLMN IDs received from the UE; the relocation requirement message sent by the source RAN includes the filtered out PLMN ID list and a CSG ID of the target cell.

In block 505: if the target cell is a CSG cell, the CN performs access control for the UE according to the CSG ID of the target cell and a list of the accessible CSGs of the UE. If the target cell is a hybrid cell, the CN performs a member authentication for the UE and sends information indicating whether the UE is or is not the member to the target RAN in the block 506.

If the MME selects the PLMN for the UE, the source CN selects one PLMN ID from the PLMN IDs received from the source RAN according to the information of the accessible CSGs of the UE, the PLMN ID and the CSG ID are in the list of the accessible CSGs of the UE, the source CN selects the target PLMN ID for the UE and sends the information of the PLMN selected for the UE to the target RAN in the block 506.

In block 506: a HNB GW receives the relocation request message from the CN.

In block 507: the HNB GW triggers a register procedure of the UE, and the HNB GW/HNB authenticates the CSG ID in the received relocation request message.

In block 508: the conventional relocation procedure is continued, which is described in TS25.413, TS23.060.

Figure 6:
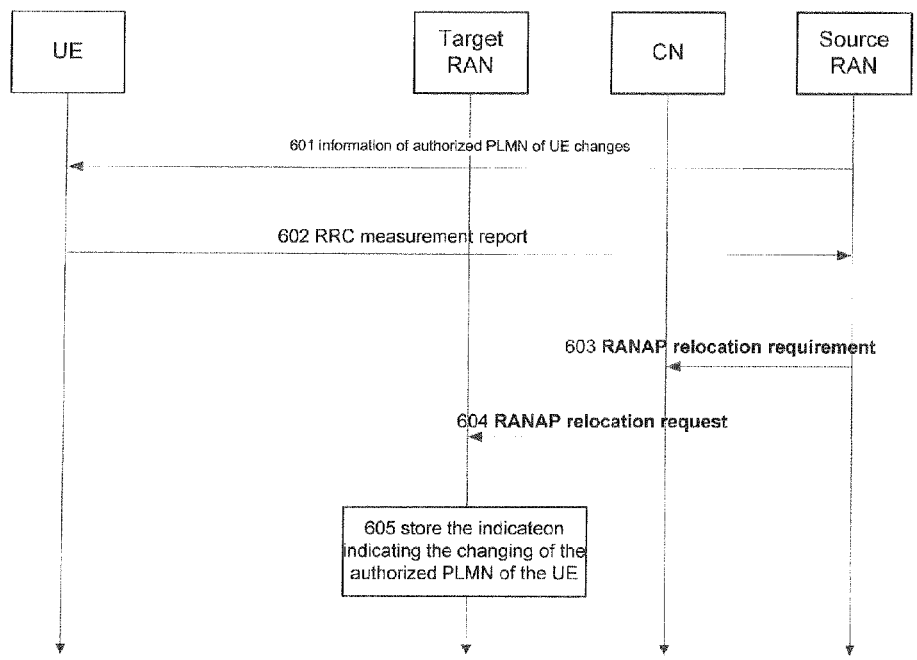
FIG. 6 is a flowchart illustrating a procedure of notifying a target RAN of PLMN changing information in a first method for supporting handover to a CSG cell or a hybrid cell according to an embodiment of the present invention.

FIG. 6 is a flowchart illustrating a first method for supporting handover to a CSG cell or a hybrid cell according to a second embodiment of the present invention. The operations not related to the present invention are omitted. As shown in FIG. 6, the method includes the following operations.

In block 601: the block 601 is the same as the block 501 and is not described herein.

In block 602: a UE sends a RRC message measurement report to a source RAN.

In block 603: the source RAN decides to initiate a relocation procedure to the target cell.

The source RAN sends a relocation requirement message to a CN.

There are two methods for notifying a target RAN of an indication indicating changing of the authorized PLMN of the UE.

In the first method, the source RAN sends the indication indicating the changing of the authorized PLMN of the UE to a target RAN via the relocation requirement message and relocation request message which may be sent by the source RAN to the target RAN via a transparent transmission container or may be sent to the target RAN via the relocation requirement message and relocation request message.

In the second method, the CN stores information changing of the authorized PLMN when the UE is in a connection mode. The CN notifies the target RAN in the block 604.

In block 604: the CN sends a relocation request message to the target RAN. Corresponding to the second method for notifying the target RAN of the indication indicating the changing of the authorized PLMN of the UE, the relocation request message includes the indication indicating the changing of the authorized PLMN of the UE.

In block 605: the target RAN stores the indication indicating the changing of the authorized PLMN of the UE.

The conventional relocation procedure is continued, which is described in TS25.413, TS23.060.

Figure 7:
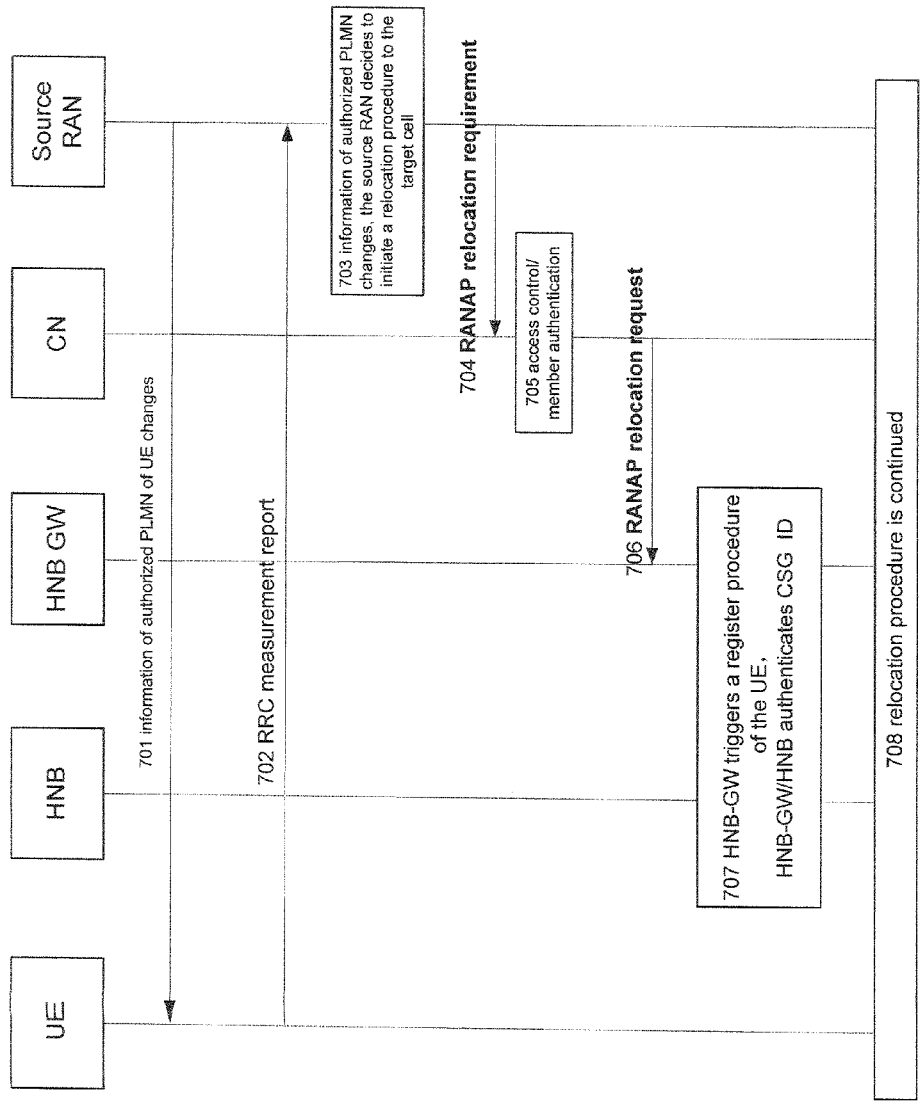
FIG. 7 is a flowchart illustrating a first method for supporting handover to a CSG cell or a hybrid cell according to a third embodiment of the present invention.

FIG. 7 is a flowchart illustrating a first method for supporting handover to a CSG cell or a hybrid cell according to a third embodiment of the present invention. The operations not related to the present invention are omitted. As shown in FIG. 7, the method includes the following operations.

In block 701: the block 701 is the same as the block 501 and is not described herein.

In block 702: UE sends a RRC message measurement report to a source RAN. The measurement report includes a cell identification of a target CSG cell, a CSG identification. If the UE receives the indication indicating the changing of the authorized PLMN of the UE from the RAN, even if the UE determines that the UE is not the member of the target CSG cell, the UE also sends the measurement report to the source RAN.

In block 703: the source RAN decides to initiate a relocation procedure to the target cell. The source RAN stores the indication indicating the changing of the authorized PLMN of the UE, even if the UE determines that the UE is not the member of the target CSG cell, the source RAN also initiates a handover procedure for the UE. Finally, the CN determines whether the UE is the member.

In block 704: the source RAN sends a relocation requirement message to the CN.

In block 705: if the target cell is a CSG cell, the CN performs access control for the UE according to the CSG ID of the target cell and the list of the accessible CSGs of the UE. If the target cell is a hybrid cell, the CN performs a member authentication for the UE and sends information indicating whether the UE is or is not the member to the target RAN in the block 706.

In block 706: a HNB GW receives the relocation request message from the CN.

In block 707: the HNB GW triggers a register procedure of the UE, and the HNB GW/HNB authenticates the CSG ID in the received relocation request message.

In block 708: the conventional relocation procedure is continued, which is described in TS25.413, TS23.060.

Figure 8:
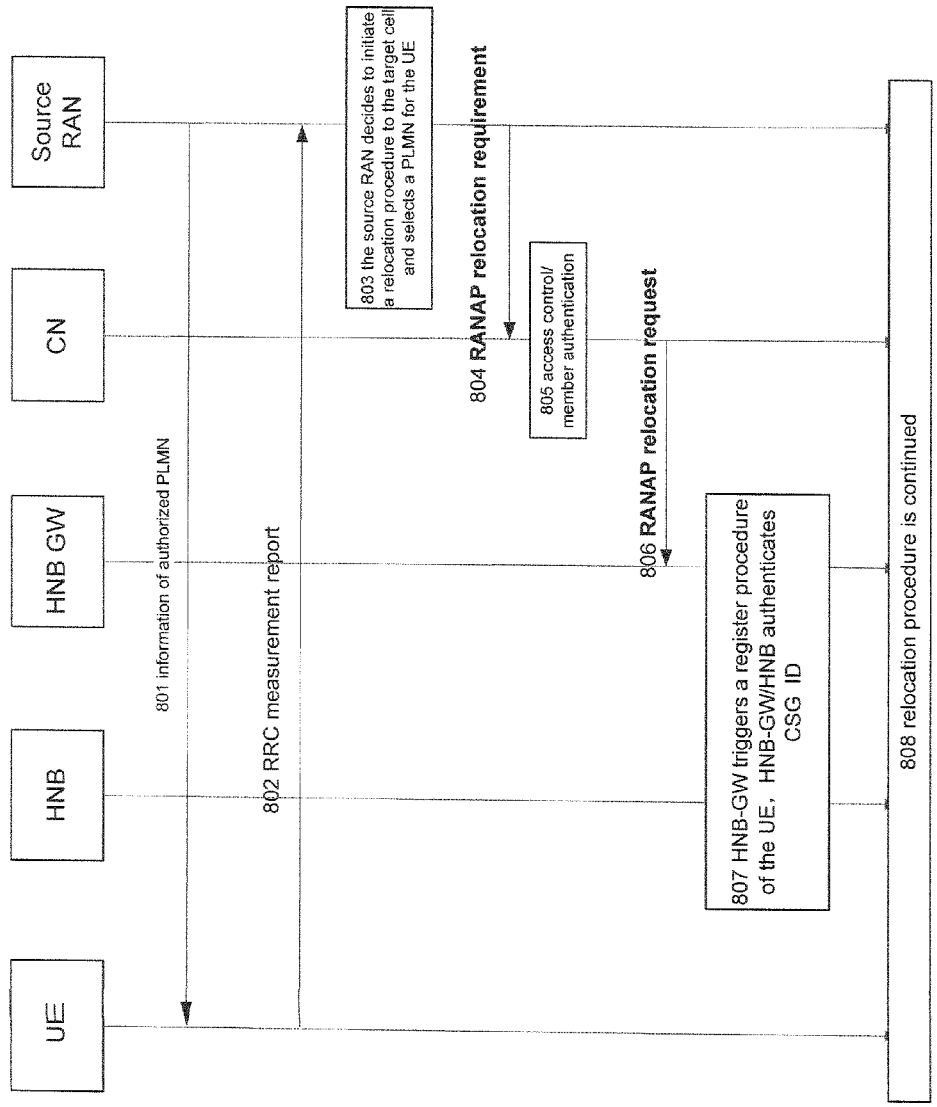
FIG. 8 is a flowchart illustrating a second method for supporting handover to a CSG cell or a hybrid cell according to an embodiment of the present invention.

FIG. 8 is a flowchart illustrating a second method for supporting handover to a CSG cell or a hybrid cell according to an embodiment of the present invention. The operations not related to the present invention are omitted. As shown in FIG. 8, the method includes the following operations.

In block 801: a source RAN sends information of authorized PLMN to UE. The information of authorized PLMN may be a list of PLMN ID that the UE is authorized to access. The source RAN may send the information to the UE when receiving the information of the authorized PLMN from a CN or when receiving information of updated authorized PLMN from the CN. The information may be a list of PLMN ID that the UE is authorized to access, or include an rPLMN and an ePLMN list respectively. The UE stores the information of authorized PLMN.

In block 802: the UE sends a RRC message measurement report to a source RAN. The measurement report includes a cell identification of a target CSG cell, a CSG identification. The information also includes a PLMN ID or a PLMN ID list. The PLMN ID is in PLMN IDs broadcasted by a target CSG cell and is the rPLMN or ePLMN of the UE, and the PLMN ID and a CSG ID of the target cell are in the list of the accessible CSGs of the UE. When the target cell does not support network sharing, the PLMN ID is included in the ECGI or TAI, and thus the message may not include the PLMN ID.

In block 803: the source RAN decides to initiates a relocation procedure to the target cell, and selects a target PLMN for the UE. The source RAN selects the PLMN ID which is the rPLMN or ePLNN of the UE in the PLMN IDs reported by the UE.

In block 804: the source RAN sends a relocation requirement message to the CN.

In block 805: if the target cell is a CSG cell, the CN performs access control for the UE according to the CSG ID of the target cell and the list of the accessible CSGs of the UE. If the target cell is a hybrid cell, the CN performs a member authentication for the UE and sends information indicating whether the UE is or is not the member to the target RAN in the block 806.

In block 806: a HNB GW receives a relocation request message from the CN.

In block 807: the HNB GW triggers a register procedure of the UE, and the HNB GW/HNB authenticates the CSG ID in the received relocation request message.

In block 808: the conventional relocation procedure is continued, which is described in TS25.413, TS23.060.

The foregoing are preferred embodiments to further describe the object, technical solution and merits of the present invention. It should be understand that the above are only preferred embodiments of the present invention and are not for use in limiting the protection scope of the present invention. Any modification, equivalent replacement and improvement made within the scope of the present invention should be covered under the protection scope of the present invention.

The invention claimed is:

1. A method for supporting handover, by a first evolved node b (eNB) included in a source cell, in a communication system, comprising:
    transmitting, to a user equipment (UE), information indicating that a public land mobile network (PLMN) authorized for the UE is changed;
    receiving, from the UE, a measurement report including PLMN identifiers (IDs) broadcasted by a target cell, the PLMN IDs being IDs of PLMNs available in the target cell;
    determining a target PLMN for the UE from among the PLMNs, based on the measurement report; and
    transmitting, to the UE, information for the determined target PLMN.

2. A method for supporting a handover, by a user equipment (UE), in a communication system, comprising:
- receiving, from a first evolved node b (eNB) included in a source cell, information indicating that a public land mobile network (PLMN) authorized for the UE is changed;
- transmitting, to the first eNB, a measure report including PLMN identifiers (IDs) broadcasted by a target cell, the PLMN IDs being IDs of PLMNs available in the target cell ; and
- receiving, from the first eNB, information for a target PLMN determined from among the PLMNs based on the measurement report.

3. The method of claim 1, wherein transmitting, to the UE, information indicating that the PLMN authorized for the UE is changed comprises transmitting, to the UE, the information indicating that the PLMN authorized for the UE is changed if a PLMN authorized for the UE received from a mobile management entity (MIME) changes.

4. The method of claim 1, further comprising:
- if the UE moves from a second eNB to the first eNB, receiving, from the second eNB, the information indicating that the PLMN authorized for the UE is changed in a connection mode.

5. The method of claim 1, further comprising:
- if the UE moves from a second eNB to the first eNB, receiving, from a mobile management entity (MME), the information indicating that the PLMN authorized for the UE is changed in a connection mode.

6. The method of claim 1, wherein determining the target PLMN for the UE comprises:
- filtering out a PLMN ID for the PLMN authorized for the UE from the PLMN IDs included in the measurement report;
- transmitting, to a mobile management entity (MME), the filtered out PLMN ID and an accessible ID of the target cell;
- receiving, from the MME, a filtered out PLMN ID according the accessible ID of the target cell from the filtered out PLMN ID; and
- selecting a target PLMN ID for the target PLMN from the received PLMN ID.

7. The method of claim 1, wherein determining the target PLMN for the UE comprises:
- receiving, from a mobile management entity (MME) accessible ID of the target cell;
- filtering out PLMN ID for the PLMN authorized for the UE according to the accessible ID of the target cell from the PLMN IDs included in the measurement report; and
- selecting, a target PLMN ID for the target PLMN from the filtered out PLMN ID.

8. The method of claim 1, the target cell is a closed subscriber group (CSG) cell or a hybrid cell.

9. A method for supporting handover, by a mobile management entity (MME), in a communication system, comprising:
- receiving from a first evolved node b eNB included in a source cell a measurement report including public land mobile network (PLMN) identifiers (IDs) broadcasted by a target cell, wherein the PLMN IDs being IDs of PLMNs available in the target cell
- selecting a target PLMN for a user equipment (UE) from among the PLMNs, based on the measurement report; and
- transmitting, to the first eNB, first information for the selected target PLMN wherein the first eNB transmits, to a user equipment (UE), second information indicating that a public land mobile network (PLMN) authorized for the UE is changed.

10. The method of claim 9, further comprising:
- if the UE moves from a second eNB to the first eNB, transmitting, to the first eNB, the second information in a connection mode.

11. The method of claim 9, wherein the selecting the target PLMN for the UE comprises:
- receiving, from the first eNB, an accessible ID of the target cell and a filtered out PLMN ID from the PLMN IDs included in the measurement report, wherein the filtered out PLMN ID is corresponded to the PLMN authorized for the UE; and
- filtering out a PLMN ID according to the accessible ID of the target cell from the filtered out PLMN ID.

12. The method of claim 9, the target cell is a closed subscriber group (CSG) cell or a hybrid cell.

13. The method of claim 2, wherein receiving, from the first eNB, the information indicating that the PLMN authorized is changed receiving, from the first eNB, the information indicating that the PLMN authorized is changed if a PLMN authorized for the UE received from a mobile management entity (MME) changes.

14. The method of claim 2, wherein receiving, from the first eNB, the information indicating that the PLMN authorized for the UE is changed comprises:
- receiving, from the first eNB, the information indicating that the PLMN authorized for the UE is changed if the UE moves from a second eNB to the first eNB.

15. The method of claim 2, wherein receiving, from the first eNB, the information indicating that the PLMN authorized for the UE is changed comprises:
- receiving, from the first eNB, the information indicating that the PLMN authorized for the UE is changed received by a mobile management entity (MME) if the UE moves from a second eNB to the first eNB.

16. The method of claim 2, wherein receiving, from the first eNB, the information for the target PLMN determined from among the PLMNs based on the measurement report comprises:
- when a PLMN ID according to the PLMN authorized for the UE is filtered out from the PLMN IDs included in the measurement report and a PLMN ID according to an accessible ID of the target cell is filtered out from the filtered out PLMN ID by the first eNB, receiving, from the first eNB, information including the filtered out PLMN ID according to the accessible ID of the target cell.

17. The method of claim 2, wherein receiving, from the first eNB, the information for the target PLMN determined from among the PLMNs based on the measurement report comprises:
- when a PLMN ID according to the PLMN authorized for the UE is filtered out from the PLMN IDs included in the measurement report and a PLMN ID according to an accessible ID of the target cell is filtered out from the filtered out PLMN ID by a mobile management entity (MME), receiving, from the first eNB, information including the filtered out PLMN ID according to the accessible ID of the target cell.

18. The method of claim 2, the target cell is a closed subscriber group (CSG) cell or a hybrid cell.

19. An apparatus for supporting handover in a first evolved node b (eNB) included in a source cell, in a communication system, comprising:

a transmitter configured to transmit, to a user equipment (UE), information indicating that a public land mobile network (PLMN) authorized for the UE is changed;

a receiver configured to receive, from the UE, a measurement report including PLMN identifiers (IDs) broadcasted by a target cell, the PLMN IDs being IDs of PLMNs available in the target cell; and a controller configured to determine a target PLMN for the UE from among the PLMNs, based on the measurement report and controlling to transmit, to the UE, information for the determined target PLMN.

20. The apparatus of claim 19, wherein the transmitter is configured to transmit, to the UE, the information indicating that the PLMN authorized for the UE is changed if a authorized PLMN authorized for the UE received from a mobile management entity (MME) changes.

21. The apparatus of claim 19, wherein the receiver is configured to receive, from a second eNB, the information indicating that the PLMN authorized for the UE is changed in a connection mode if the UE moves from the second eNB to the first eNB.

22. The apparatus of claim 19, wherein the receiver is configured to receive, from a mobile management entity (MME), the information indicating that the PLMN authorized for the UE is changed in a connection mode if the UE moves from a second eNB to the first eNB.

23. The apparatus of claim 19, wherein the controller is configured to filter out a PLMN ID for the PLMN authorized for the UE from the PLMN IDs included in the measurement report, control to transmit, to a mobile management entity (MME), the filtered out PLMN ID and an accessible ID of the target cell, control to receive, from the MME, a filtered out PLMN ID according the accessible ID of the target cell from the filtered out PLMN ID, and select a target PLMN ID for the target PLMN from the received PLMN ID.

24. The apparatus of claim 19, wherein the control is configured to control to receive, from a mobile management entity (MME), an accessible ID of the target cell, filter out PLMN ID for the PLMN authorized for the UE according to the accessible ID of the target cell from the PLMN IDs included in the measurement report, and select a target PLMN ID for the target PLMN from the filtered out PLMN.

25. The apparatus of claim 19, wherein the target cell is a closed subscriber group (CSG) cell or a hybrid cell.

26. An apparatus for supporting handover in a mobile management entity (MME) comprised in a communication system, comprising:

a receiver configured to receive, from a first evolved node b (eNB), a measurement report including public land mobile network (PLMN) identifiers (IDs) broadcasted by a target cell, wherein the PLMN IDs being IDs of PLMNs available in the target cell;

a controller configured to select a target PLMN for a user equipment (UE) from among the PLMNs, based on the measurement report; and a transmitter configured to transmit, to the first eNB, first information for the selected target PLMN;

wherein the first eNB transmits, to a user equipment (UE), second information indicating that a public land mobile network (PLMN) authorized for the UE is changed.

27. The apparatus of claim 26, wherein the transmitter is configured to transmit, to the first eNB, the second information if the UE moves from a second eNB to the first eNB.

28. The apparatus of claim 26, wherein the controller is configured to control to receive, from the first eNB, an accessible ID of the target cell and a filtered out PLMN ID from the PLMN IDs included in the measurement report, wherein the filtered out PLMN ID is corresponded to the PLMN authorized for the UE, and filter out a PLMN ID according to the accessible ID of the target cell from the filtered out PLMN ID.

29. The apparatus of claim 26, wherein the target cell is a closed subscriber group (CSG) cell or a hybrid cell.

30. An apparatus for supporting handover, in user equipment (UE) comprised in a communication system, comprising:

a receiver configured to receive, from a first evolved node b (eNB), information indicating that a public land mobile network (PLMN) authorized for the UE is changed;

a transmitter configured to transmit, to the first eNB, a measurement report including PLMN identifiers (IDs) broadcasted by a target cell, the PLMN IDs being IDs of PLMNs available in the target cell; and a controller configured to control to receive, from the first eNB, information for a target PLMN determined from among the PLMNs based on the measurement report.

31. The apparatus of claim 30, wherein the receiver is configured to receive, from the first eNB, the information indicating that the PLMN authorized for the UE is changed if a PLMN authorized for the UE received from a mobile management entity (MME) changes.

32. The apparatus of claim 30, wherein the receiver is configured to receive, from the first eNB, the information indicating that the PLMN authorized for the UE is changed if the UE moves from a second eNB to the first eNB.

33. The apparatus of claim 30, wherein the receiver is configured to receive, from the first eNB, the information indicating that the PLMN authorized for the UE is changed received by a mobile management entity (MME) if the UE moves from a second eNB to the first eNB.

34. The apparatus of claim 30, when a PLMN ID according to the PLMN authorized for the UE is filtered out from the PLMN IDs included in the measurement report and a PLMN ID according to an accessible ID of the target cell is filtered out from the filtered out PLMN ID by the first eNB, wherein the receiver is configured to receive, from the first eNB, information including the filtered out PLMN ID according to the accessible ID of the target cell.

35. The apparatus of claim 30, when a PLMN ID according to the PLMN authorized for the UE is filtered out from the PLMN IDs included in the measurement report and a PLMN ID according to an accessible ID of the target cell is filtered out from the filtered out PLMN ID by a mobile management entity (MME), wherein the receiver is configured to receive, from the first eNB, information including the filtered out PLMN ID according to the accessible ID of the target cell.

36. The apparatus of claim 30, wherein the target cell is a closed subscriber group (CSG) cell or a hybrid cell.

* * * * *